(12) United States Patent
Tominaga et al.

(10) Patent No.: US 10,310,358 B2
(45) Date of Patent: Jun. 4, 2019

(54) LENS BARREL AND CAMERA

(71) Applicant: KOWA COMPANY, LTD., Aichi (JP)

(72) Inventors: Shuichi Tominaga, Saitama (JP); Suguru Hanzawa, Saitama (JP)

(73) Assignee: KOWA COMPANY, LTD., Aichi (JP)

(*) Notice: Subject to any disclaimer, the term of this patent is extended or adjusted under 35 U.S.C. 154(b) by 149 days.

(21) Appl. No.: 15/504,419

(22) PCT Filed: Sep. 7, 2015

(86) PCT No.: PCT/JP2015/075334
§ 371 (c)(1),
(2) Date: Feb. 16, 2017

(87) PCT Pub. No.: WO2016/039294
PCT Pub. Date: Mar. 17, 2016

(65) Prior Publication Data
US 2018/0224712 A1    Aug. 9, 2018

(30) Foreign Application Priority Data

Sep. 8, 2014 (JP) ................. 2014-182445
Feb. 5, 2015 (JP) ................. 2015-021467

(51) Int. Cl.
*G02B 7/02* (2006.01)
*G03B 9/06* (2006.01)
*G02B 5/00* (2006.01)

(52) U.S. Cl.
CPC ............. *G03B 9/06* (2013.01); *G02B 5/005* (2013.01); *G02B 7/02* (2013.01)

(58) Field of Classification Search
CPC .......... G02B 5/005; G02B 13/00; G02B 7/02; G02B 7/04; G02B 7/10; G02B 7/026; G03B 9/06; G03B 9/02; G03B 9/22; G03B 9/10; G03B 7/0805

USPC ....... 359/740, 739, 703, 704, 611, 826, 830, 359/827; 396/449, 451, 458, 505
See application file for complete search history.

(56) References Cited

U.S. PATENT DOCUMENTS 4,349,265 A * 9/1982 Kobayashi ............. G03B 17/14
359/825
2013/0163979 A1* 6/2013 Kuroiwa ................. G03B 9/02
396/505

FOREIGN PATENT DOCUMENTS

JP         5166597 B1      3/2013
JP    WO2013/031407 A1   3/2015

OTHER PUBLICATIONS

International Search Report dated Dec. 1, 2015, issued by Japanese Patent Office for corresponding International Application No. PCT/JP2015/075334.

* cited by examiner

Primary Examiner — Jie Lei
(74) Attorney, Agent, or Firm — Duane Morris LLP (57) ABSTRACT

In the present invention, an edge face of an diaphragm ring (4) has a part (a locked portion) wherein a plurality of depressions (62) are formed and a substantially flat surface portion wherein no depression (62) is formed, and by a simple operation of operating a link releaser (52) so as to rotate the diaphragm ring (4), it is possible to switch between a click mode and a non-click mode. When taking still images, a diaphragm value can be fixed by using the click mode, and when video is taken, the diaphragm value can be smoothly changed during imaging by using the non-click mode.

5 Claims, 10 Drawing Sheets

LENS BARREL AND CAMERA

CROSS-REFERENCE TO RELATED PATENT APPLICATIONS

The present application is a U.S. national stage application under 35 U.S.C. § 371 of PCT Application No. PCT/JP2015/075334, filed Sep. 7, 2015, which claims priority to Japanese patent application No. JP 2014-182445 filed on Sep. 8, 2014 and Japanese patent application no. JP 2015-021467 filed on Feb. 5, 2015, the entire contents of which are incorporated by reference herein.

TECHNICAL FIELD

This invention relates to a lens barrel with diaphragm mechanism that has a diaphragm which aperture diameter can be changed, a fixed portion that stores the diaphragm, and a diaphragm ring that is rotatably attached to the fixed portion so as to adjust the aperture diameter of the diaphragm, and a camera with the lens barrel.

BACKGROUND ART

In late years, video cameras, single-lens reflex cameras and mirrorless cameras that are configured to take both motion pictures and still images (simply "the cameras" hereinafter) are spreading.

Generally, in such a camera, a diaphragm value is changed (adjusted) in a camera body. But, in some cameras, a lens barrel is provided with a diaphragm ring, and the diaphragm value is changed by turning the diaphragm ring (for instance, see Patent related document 1).

Figure 7:
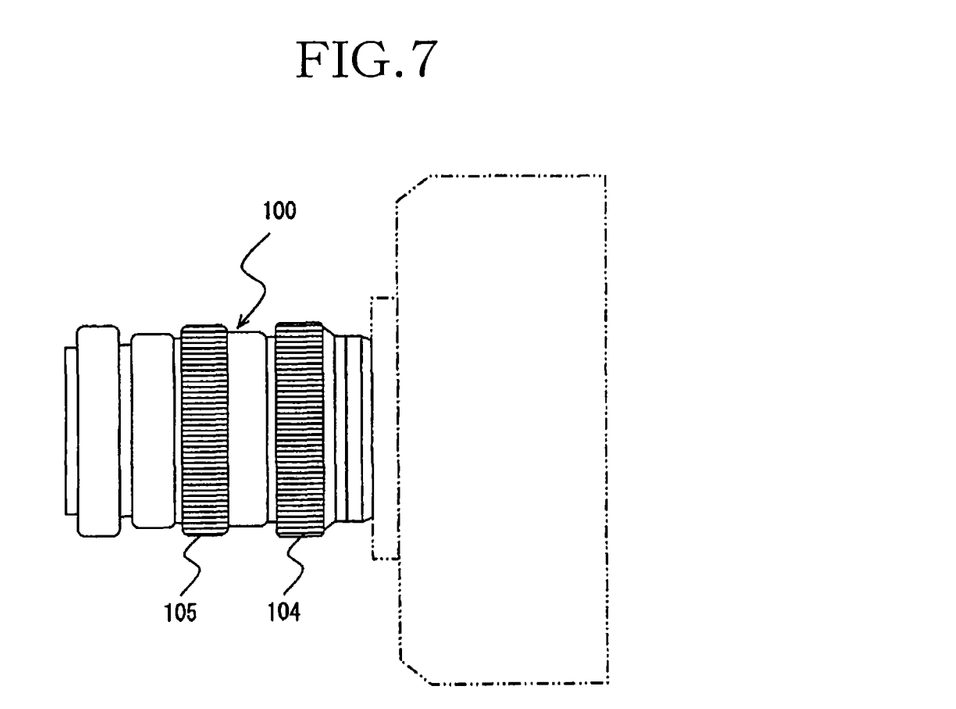
FIG. 7 is a plan view that shown an instance of a conventional configuration of the lens barrel with diaphragm adjustment function.

FIG. 7 is a plan view that shows an instance of a conventional structure of a lens barrel with diaphragm adjustment mechanism, and a reference number 100 in the figure denotes a lens barrel, a reference number 104 denotes a diaphragm ring being free to be rotated, and a reference number 105 denotes a focus ring. Such a diaphragm ring 104 is provided with a click mechanism (not shown) that is configured to fix the diaphragm ring 104 at a predetermined diaphragm value, F-value, such as F1.4, F2, F2.8 . . . so as to restrict its free rotation.

When taking a still image with such a camera, the diaphragm value is set in advance, taking brightness of a subject into consideration. In some cases, when taking a motion picture, the change of the diaphragm value is desired without fixing during taking it. For instance, in a case where a motion picture is obtained in a moving helicopter or on a car, or a motion picture is obtained, putting the camera on a radio control helicopter, brightness of a subject may be widely changed, and a diaphragm value may be needed to be changed in order, depending on the brightness of a subject. In such a case, the above-mentioned click mechanism may obstruct a smooth rotation of the diaphragm ring 104, and a microphone of the camera may catch click sounds.

Then, the lens barrel for solving such problems has been proposed (for instance, see Patent related document 2).

Figure 8:
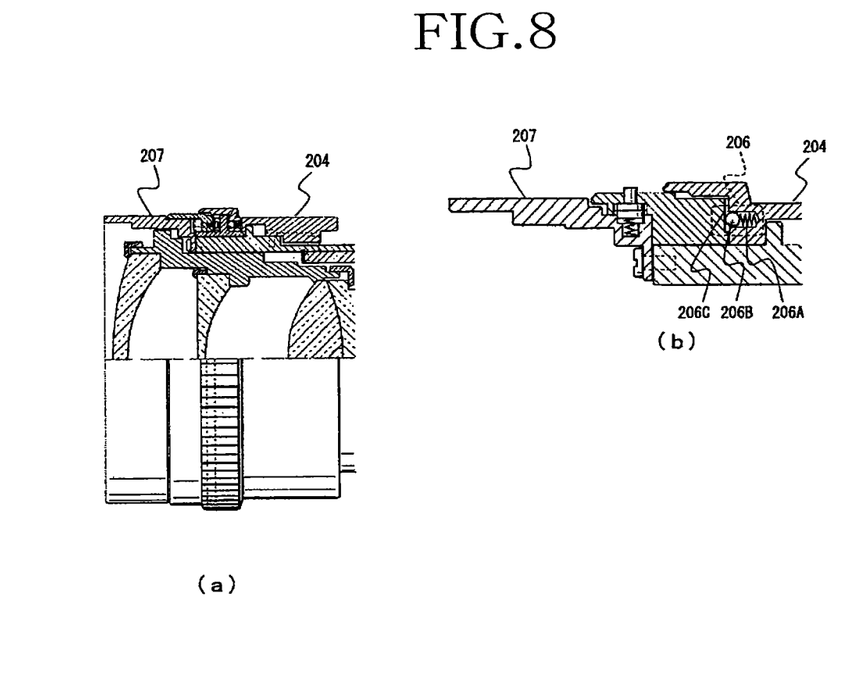
FIG. 8(a) is a partial sectional view that shows an another instance of the conventional configuration of the lens barrel with diaphragm adjustment function and FIG. 8(b) is its enlarged sectional view.

FIG. 8(*a*) is a cross sectional view that shows another instance of the lens barrel with diaphragm adjustment mechanism having a conventional configuration, and FIG. 8(*b*) is its enlarged sectional view. A reference number 204 in the figure denotes a diaphragm ring, a reference number 206 is a click mechanism, a reference number 206A denotes a spring that is a component of the click mechanism 206, and a reference number 206B denotes a click ball that is energized through the spring 206A. And, a reference number 206C denotes an engaged portion with which the click ball 206B is able to be engaged, and a reference number 207 denotes an annular member which end surface has two or more engaged portions 206C. Such a annular member 207 is configured to be freely rotated, such that a contact between the click ball 206B and the engaged portion 206C is released when the annular member 207 is 180° rotated, and the click mechanism stops.

PRIOR ART

Patent Related Document

Patent related document 1: Official gazette of Japanese patent application publication No. 2012-29152
Patent related document 2: Official gazette of Japanese patent No. 5166597

SUMMARY OF INVENTION

Problems to be Solved by Invention

But, the configuration as shown in FIG. 8 has such a problem that it is necessary to rotate both the annular member 207 and the diaphragm ring 204 in order to stop the click mechanism and change the diaphragm value. Then, its operation is complex.

An object of the invention is to provide the lens barrel for solving the above-mentioned problem and the cameral with such a lens barrel.

Means for Solving Problems

A first aspect of the invention as exemplarily shown in FIGS. 1 through 4 and 9 is a lens barrel (1, 301) that has a diaphragm (2, 302) whose aperture diameter can be changed, a fixed portion (3, 303) that stores the diaphragm (2, 302), a diaphragm ring (4, 304) that is rotatably attached to the fixed portion (3, 303) so as to adjust the aperture diameter of the diaphragm (2, 302). In the lens barrel embodiment (1) shown in FIGS. 1 and 2, the portion of the diaphragm ring (4) facing the fixed portion (3) is a second facing portion (P2) and the portion of the fixed portion (3) facing the second facing portion (P2) is a first facing portion (P1). In the lens barrel embodiment (301) shown in FIG. 9, the portion of the diaphragm ring (304) facing a cylindrical portion (333) is a first facing portion (P1) and the portion of the cylindrical portion (333) facing the first facing portion (P1) is a second facing portion (P2).

The lens barrel (1, 301) includes: first and second projections (50A, 50B or 350A, 350B) that are located at two positions along a peripheral direction (see arrow C of FIGS. 3 and 4) of the diaphragm (2, 302) for releasably linking the diaphragm ring (4, 304) to the diaphragm (2, 302) for adjusting the aperture diameter of the diaphragm;

a fitting slot (51, 351) that is formed on a side of the diaphragm ring (4, 304) for alternatingly fitting one of the first and second projections (50A, 50B or 350A, 350B) thereinto at a given time according to the rotation position of the diaphragm ring (4, 304) wherein when the first or second projection is fitted thereinto the diaphragm ring (4, 304) is linked to the diaphragm for adjusting the aperture diameter of the diaphragm (2, 302), and a link releaser (52, 352) that is configured to release the first and second projections (50A, 50B or 350A, 350B) from the fitting member (51, 351) and allow the diaphragm ring (4, 304) to rotate, being separated from the diaphragm (2, 302); and a click mechanism (6, 306) that is formed or located at the first facing portion (P1) and the second facing portion (P2) providing a clicking tactile feel when the diaphragm ring (4, 304) is rotated;

the click mechanism (6, 306) has a spring member (60, 360) for clicking attached to the first facing portion (P1), a locking member (61, 361) that is urged against the second facing portion (P2) through the spring member for clicking (60, 360), and a locking recesses (62, 362) that is formed or located on a side of the second facing portion (P2) so as to engage the locking member (61, 361);

the second facing portion (P2) has a locked surface portion (see a reference number P2a of FIG. 3) having two or more locking recesses (62, 362) in a peripheral direction (C), and a substantially flat surface portion (see a reference number P2b of FIG. 3) that has no locking recesses (62, 362);

whereby when the diaphragm ring (4, 304) is oriented so that the first projection (50A, 350A) is received into the fitting slot (51, 351), the locking member slides on the locked surface portion, thus providing a clicking mode when the diaphragm ring is rotated for adjusting the aperture diameter of the diaphragm; and whereby when the diaphragm is oriented so that the second projection is received into the fitting member, the locking member (61, 361) slides on the substantially flat surface portion (P2b), thus providing a non-clicking mode when the diaphragm ring (4, 304) is rotated for adjusting the aperture diameter of the diaphragm.

The second aspect of the invention is the lens barrel, wherein a direction that is pointing radially outward away from the optical axis X of the lens barrel is "outward direction" (Rout) and a direction that is pointing radially inward towards the optical axis X of the lens barrel is "inward direction" (Rin), further comprising first and second spring members (53A, 53B or 353A, 353B) attached on a side of the diaphragm (2, 302) for urging the first and second projections (50A, 50B or 350A, 350B) in the outward direction (Rout); and the fitting slot (51, 351) being formed at an inner peripheral face of the diaphragm ring (4, 304);

the link releaser (52, 352) having an actuator (520, 3520) provided within the fitting slot (51, 351) and engaged with a push button (521, 3521) and the actuator is located at a position where the first and second projections (50A, 50B or 350A, 350B) received in the fitting slot (51, 351) are urged against the actuator, and the push button (521, 3521) protrudes from an outer peripheral face (4a, 304a) of the diaphragm ring (4, 304) in the outward direction (Rout);

whereby the first or the second projection (50A, 50B or 350A, 350B) received in the fitting slot (51, 351) can be released by activating the push button (521, 3521) in the inward direction (Rin) engaging the actuator (520, 3520) to push the first or the second projection (50A, 50B or 350A, 350B) in the inward direction (Rin) and out of the fitting slot (51, 351).

The third aspect of the invention is the lens barrel, wherein the push button (521, 3521) is located so as to be inserted in a through hole (not shown) that is formed at the diaphragm ring (4, 304).

Figure 6:
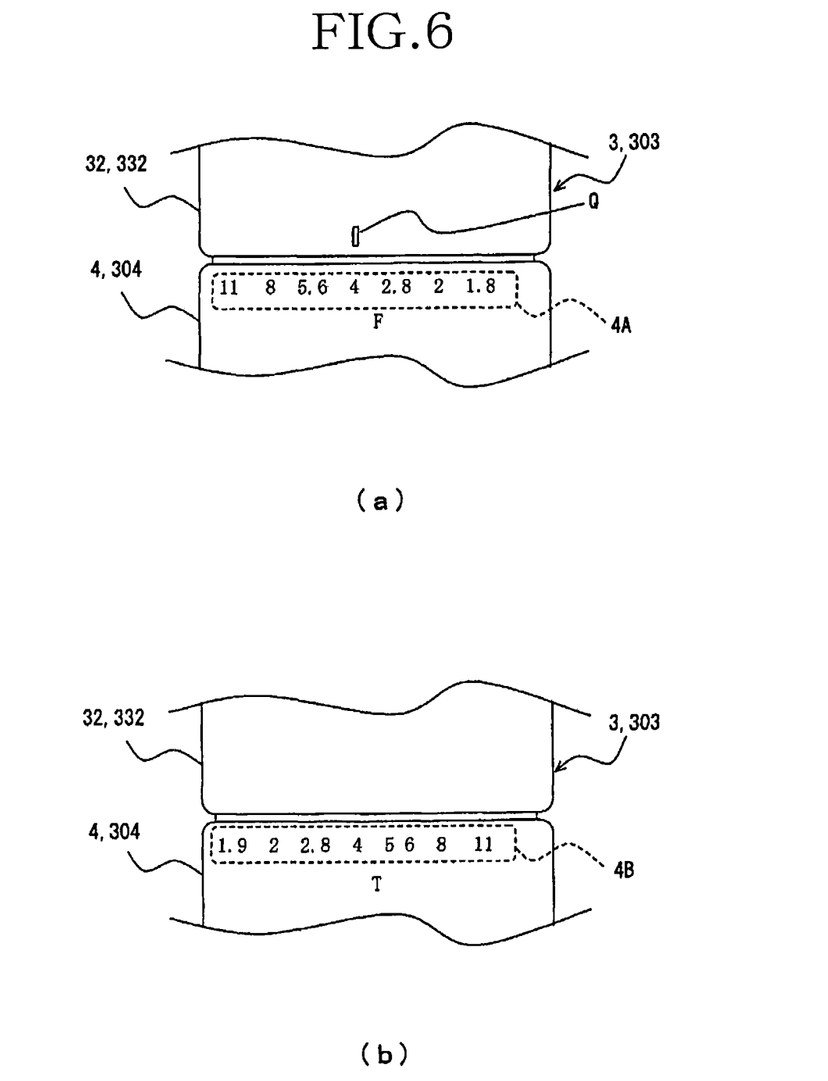
FIG. 6(a) is a plan view (the view that is seen from arrow G of FIG. 1) that shows a F-value indication section.
FIG. 6(b) is a plan view (the view that is seen from arrow H of FIG. 1) that shows a T-value indication section.

The fourth aspect of the invention as exemplarily shown in FIGS. 6(a), (b) is the lens barrel wherein an indicator (Q) is indicated at a position adjacent to the diaphragm ring (4, 304) on the fixed portion (3, 303), two or more F-values (4A) are indicated in a range of a circumferential direction of the diaphragm ring (4, 304), facing to the indication (Q) when the diaphragm ring (4, 304) is rotated to a position where the first projection (50A, 350A) is received into the fitting slot (51, 351), and two or more T-values (4B) are indicated in the range of the circumferential direction of the diaphragm ring (4, 304), facing to the indication (Q) when the diaphragm ring (4, 304) is rotated to a position where the second projection (50B, 350B) is received into the fitting slot (51, 351), and the diaphragm (2, 302) is configured to have an opening in a size to realize the F-values (4A) or the T-values (4B) facing to the indication (4).

The fifth aspect of the invention is a camera with the lens barrel (1, 301).

The number in parentheses shows the corresponding element in the drawings for the sake of convenience, accordingly, the descriptions are not restricted and bound by the descriptions on the drawings.

Effects of Invention

According to the first, fourth and fifth aspects of the invention, only the diaphragm ring (4, 304) needs to be rotated to stop the click mechanism and to change the diaphragm value, and its operation is simple.

According to the second and third aspects of the invention, the push button is located so as to protrude from the outer peripheral surface of the diaphragm ring to the lens barrel outside direction, so that such a button can be pushed into, grasping the diaphragm ring and the operation is simple.

BRIEF DESCRIPTION OF DRAWINGS

FIG. 2(a), (b) are enlarged sectional views that show the lens barrel as shown in FIG. 1.

EMBODIMENTS FOR CARRYING OUT THE INVENTION

Embodiments of the invention are mentioned, referring to appended drawings FIGS. 1 to 6, and FIGS. 9 and 10.

A lens barrel according to the invention is exemplarily shown in FIGS. 1 to 4, 9 and 10 with reference numbers 1, 301, and has a diaphragm 2, 302 whose aperture diameter can be changed, a fixed portion 3, 303 that stores the diaphragm 2, 302, and a diaphragm ring 4, 304 that is attached to the fixed portion 3, 303 so as to be free to be rotated and is configured to adjust the aperture diameter of the diaphragm 2, 302.

Figure 5:
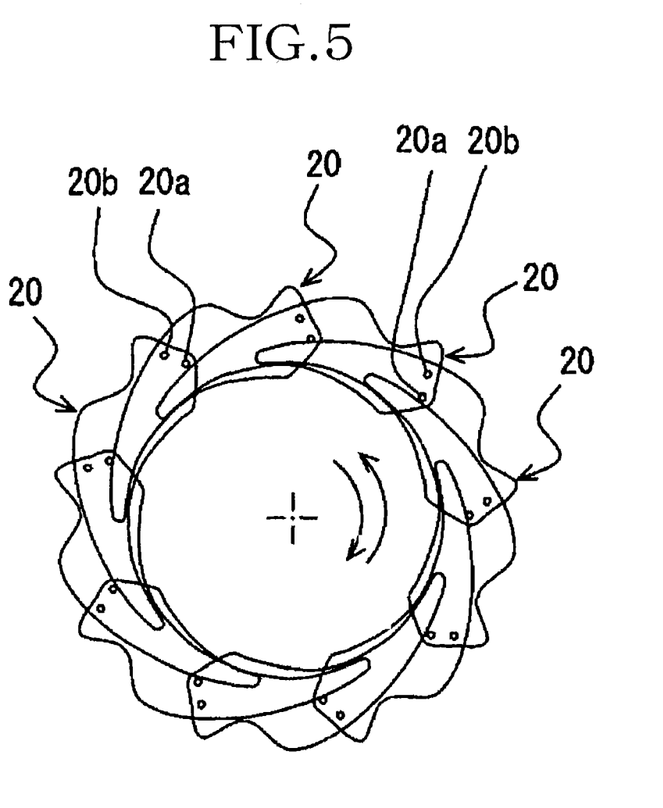
FIG. 5 is a front view that shows an instance of the configuration of a diaphragm blade.

Preferably, the diaphragm 2, 302 is an iris diaphragm and is comprised of a plurality of diaphragm blades 20 having cam shafts 20a, 20b, and an annular operation member (see a reference number 21 of FIGS. 3 and 4 and a reference number 321 of FIGS. 9 and 10) having a plurality of cam holes (see a reference number 21a of FIGS. 3 and 4 and a reference number 321 of FIG. 10) into which the cam shafts are respectively inserted, as exemplarily shown in FIG. 5. The fixed portion 3, 303 exemplarily shown in the figures is configured by connecting a plurality of cylindrical members 30, 31 (in the embodiment shown in FIG. 1) or a plurality of cylindrical members 330, 331 (in the embodiment shown in FIG. 9) through screws, but may be integrally formed.

Besides, the lens barrel 1, 301 according to the invention has a connecting arrangement 5, 305 that can selectively connect (engage) and disconnect (disengage) the diaphragm 2, 302 and the diaphragm ring 4, 304 The connecting portion 5, 305 is comprised of first and second projections 50A, 50B (or first and second projections 350A, 350B) that are located at two positions along a peripheral direction of the diaphragm 2, 302 (see arrow C of FIGS. 3, 4 and 10) for releasably linking the diaphragm ring 4, 304 to the diaphragm for adjusting the aperture diameter of the diaphragm, a fitting slot 51, 351 that is formed on a side of the diaphragm ring 4, 304 for alternatingly receiving one of the first and second projections 50A, 50B (or first and second projections 350A, 350B) thereinto at a given time according to the rotation position of the diaphragm ring 4, 304, wherein when the first or second projection is received thereinto the diaphragm ring 4, 304 is linked to the diaphragm for adjusting the aperture diameter of the diaphragm 2, 302, and a link releaser 52, 352 comprising a push button 521, 3521 that is configured to release the first and second projections 50A, 50B (or the first and second projections 350A, 350B) from the fitting slot 51, 351 (that is, releasing the first projection 50A, 350A from being received into the fitting slot 51, 351, and releasing the second projection 50B, 350B from being received into the fitting slot 51, 351) and allow the diaphragm ring 4, 304 to rotate, being separated from the diaphragm 2, 302.

According to the invention, only diaphragm ring 4, 304 needs to be rotated to stop a click function and change a diaphragm value, so that the operation and configuration are simple.

For convenience of the explanation, the peripheral directional positions of the fitting slot 51 in the diaphragm ring 4 (that is, a relative positional relation in the peripheral direction between the fitting slot 51 and a locking recess 62 that is mentioned hereinafter) are different in FIGS. 1 and 2 and FIGS. 3 and 4.

A direction that is pointing radially outward away from the optical axis X of the lens barrel is "outward direction" (Rout) and a direction that is pointing radially inward towards the optical axis X of the lens barrel is "inward direction" (Rin). The first and second projections 50A, 50B (or the first and second projections 350A, 350B) are configured to be urged in the outward direction in FIGS. 1, 2 and 9. Such a configuration is not fixed, but the projections 50A, 50B may be configured to be urged in another direction, such as an optical axis direction x as long as both are urged on the diaphragm ring 4, 304 side, and the position of the fitting slot 51, 351 is changed accordingly. For instance, the first projection 50A or the second projection 50B may be located at a portion where a member as shown with a reference number 61 in FIGS. 1 and 2(b) (details are mentioned later) is located and the other portion shifted from such a portion in a peripheral direction, such as the portion 180° away therefrom, and first and second spring members (detailedly mentioned hereinafter) are located at a portion where a spring member as shown with a reference number 60 is located and the other portion shifted from such a portion in the peripheral direction, such as the portion 180° away therefrom, so that these projections 50A, 50B can be urged in the optical axis direction, such as a direction opposite to the x direction. In such a case, the fitting slot 51 may be formed at the portion where the locking recess as shown with the reference number 62 (detailedly mentioned hereinafter) is located.

Figure 9:
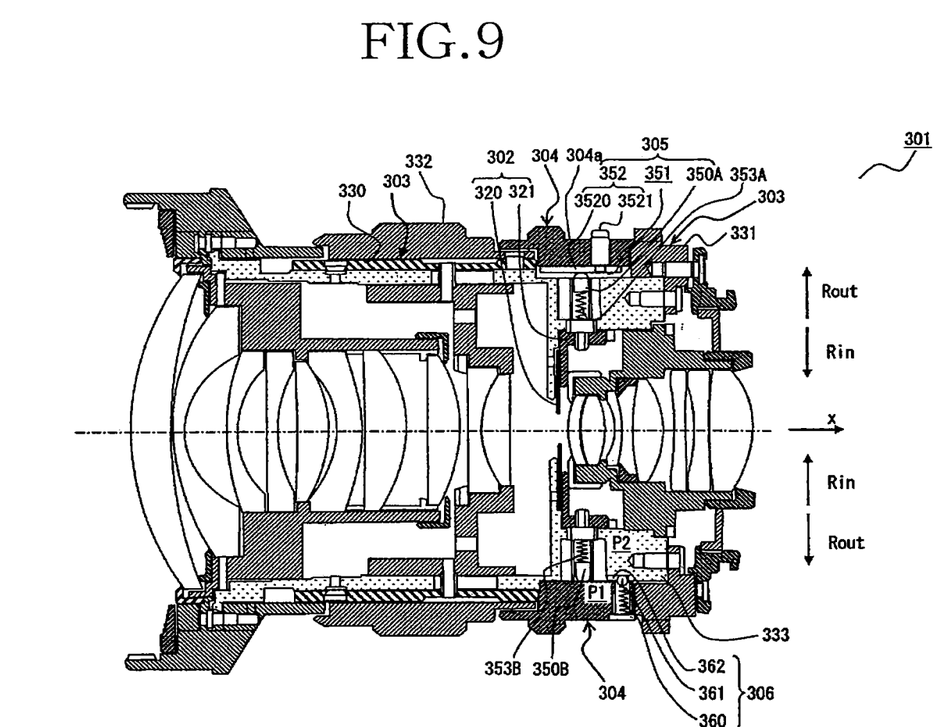
FIG. 9 is a sectional view that shows another instance of the configuration of the lens barrel according to the invention.

In a case where the first and second projections 50A, 50B (or the first and second projections 350A, 350B) are configured to be urged in the outward direction (Rout), the link releaser 52, 352 is comprised of an actuator 520, 3520 provided within the fitting slot 51, 351 and engaged with the push button 521, 3521 and the actuator is located at a position where the first and second projections 50A, 50B (or the first and second projections 350A, 350B) received in the fitting slot 51, 351, are urged against the actuator, and the push button 521, 3521 protrudes from an outer peripheral face 4a, 304a of the diaphragm ring 4, 304 in the outward direction (Rout) as detailedly shown in FIG. 2(a) and FIG. 9, so that the first or the second projection 50A, 50B (or the first or the second projection 350A, 350B) received in the fitting slot 51, 351 can be released when the push button 521, 3521 is pushed in the inward direction (Rin) engaging the actuator 520, 3520 to push the first or the second projection 50A, 50B (the first or the second projection 350A, 350B) in the inward direction (Rin) and out of the fitting slot 51, 351. Preferably, in this case, a through hole is formed at the diaphragm ring 4, 304, and the push button 521, 3521 is located so as to be inserted in the through hole. Alternatively, a notch (not shown) or a clearance (that is, the clearance between the diaphragm ring and the fixed cylindrical member 31, 331) is formed at the diaphragm ring 4, 304 with no through hole and the push button 521, 3521 is located so as to protrude in the outward direction (Rout). The push button 521, 3521 may be continuously pushed during the rotation of the diaphragm ring 4, 304, or the push button 521, 3521 can be released once the engagement between the first or the second projection 50A, 50B (the first or the second projection 350A, 350B) and the fitting slot 51, 351 is disengaged. According to the invention, the push button 521, 3521 is located so as to project from the outer peripheral face 4a, 304a of the diaphragm ring 4, 304 in the outward direction (Rout), and this configuration allows pushing down the push button 521, 3521 and holding the diaphragm ring 4, 304 in one motion and makes the operation simple.

Alternatively, both the fitting slot 51, 351 and the link releaser 52, 352 may be located at two positions such that the first and second projections 50A, 50B (or the first and the second projections 350A, 350B) are received into the respective ones at the same time. Alternatively, both may be located at one position such that the second projection 50B, 350B is not engaged with the diaphragm ring 4, 304 when the first projection 50A, 350A is received into the fitting slot 51, 351 and the first projection 50A, 350A is not engaged with the diaphragm ring 4, 304 when the second projection 50B, 350B is received into the fitting slot 51, 351. By doing so, the diaphragm ring 4, 304 is free to be rotated only by an operation of the link releaser 52, 352 located at one position, and the operation of the link release can be simple.

The fitting slot 51, 351 provided on the diaphragm ring 4, 304 that is exemplarily shown in FIG. 2(a) and FIG. 9 is in the shape of a groove that extends in the optical axis direction x of the lens barrel 1, 301, but is not limited to this shape and may be a concave structure that is not included in a concept of the groove. Besides, the fitting slot 51, 351 may not be a groove or a concave structure, but a convex structure, so that a concave structure or a groove is formed at the top of the projection 50A, 50B (or the projection 350A, 350B) to engage the convex structure provided on the diaphragm ring 4, 304. Furthermore, in an instance as shown in FIGS. 1 and 9, the first and second projections 50A, 50B (or the first and second projections 350A, 350B) are located 180° apart from each other along the peripheral direction C, but are not limited to such positions, and may be located at proper positions.

Figure 10:
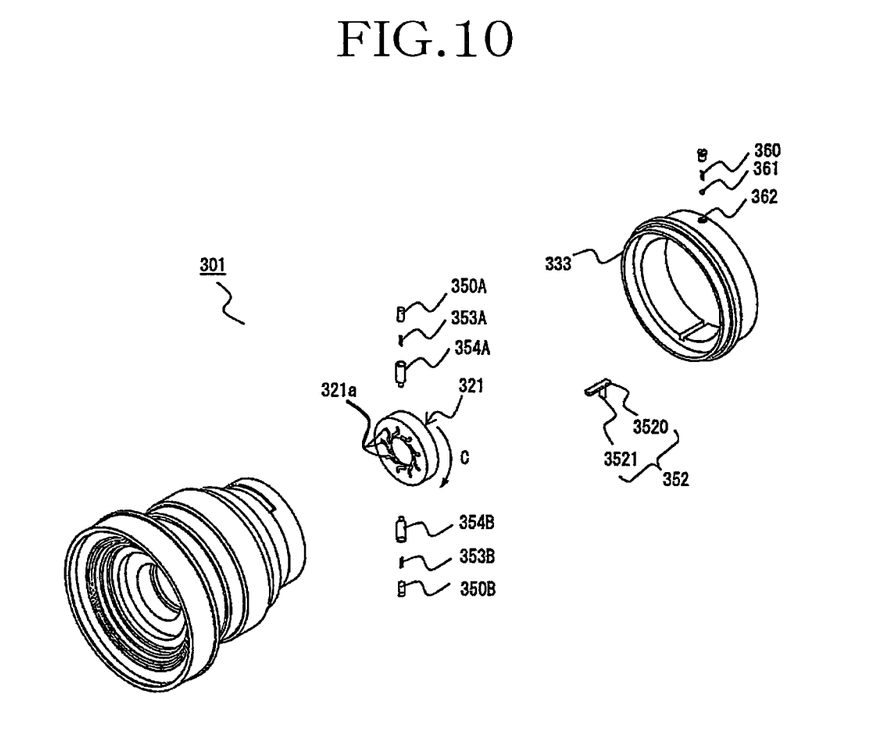
FIG. 10 is a disassembled perspective view that shown the configuration of the lens barrel as shown in FIG. 9.

On the other hand, preferably, the first and second projections 50A, 50B (or the first and second projections 350A, 350B) are urged in the outward direction (Rout) through operation of the first and second spring members 53A, 53B (or first and second spring members 353A, 353B) attached on the side of the diaphragm 2, 302. A member as shown with a reference number 54A, 54B in FIGS. 2(a), (b) and a member as shown with a reference number 354A, 354B in FIG. 10 are ones for attaching the first and second spring members 53A, 53B to the diaphragm 2 (correctly speaking, the operation member 21). And, the first and second spring members 53A, 53B (or the first and second spring members 353A, 353B) as exemplarily shown in FIGS. 1 through 4, and FIGS. 9 and 10 are coil springs provided between the diaphragm 2, 302 and the first and second projections 50A, 50B (or the first and second projections 350A, 350B), but are not limited to ones, and may have another shapes.

Figure 1:
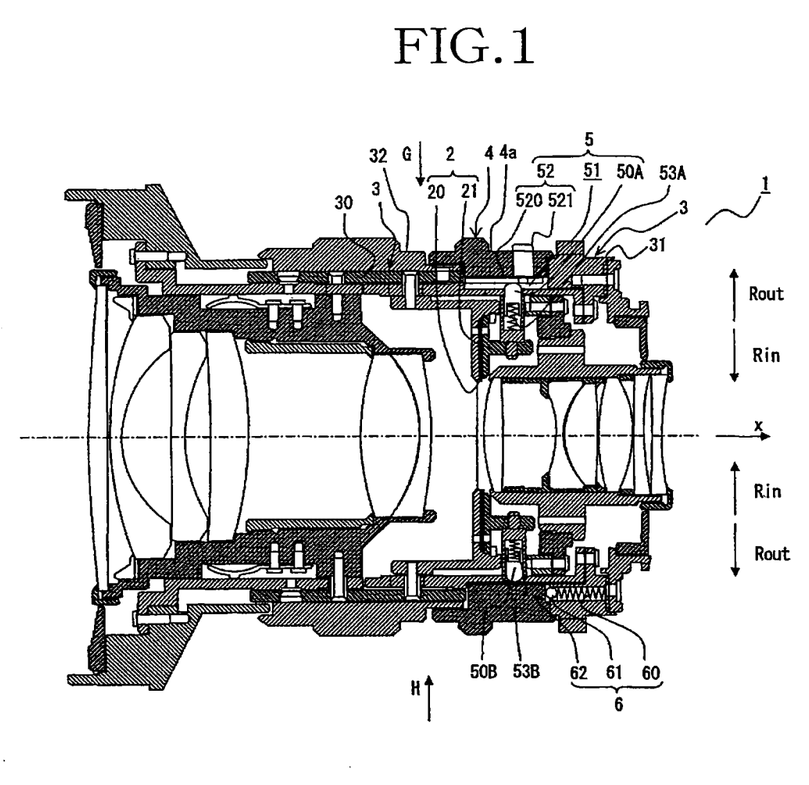
FIG. 1 is a sectional view that shows an instance of a configuration of a lens barrel according to the invention.
Figure 2:
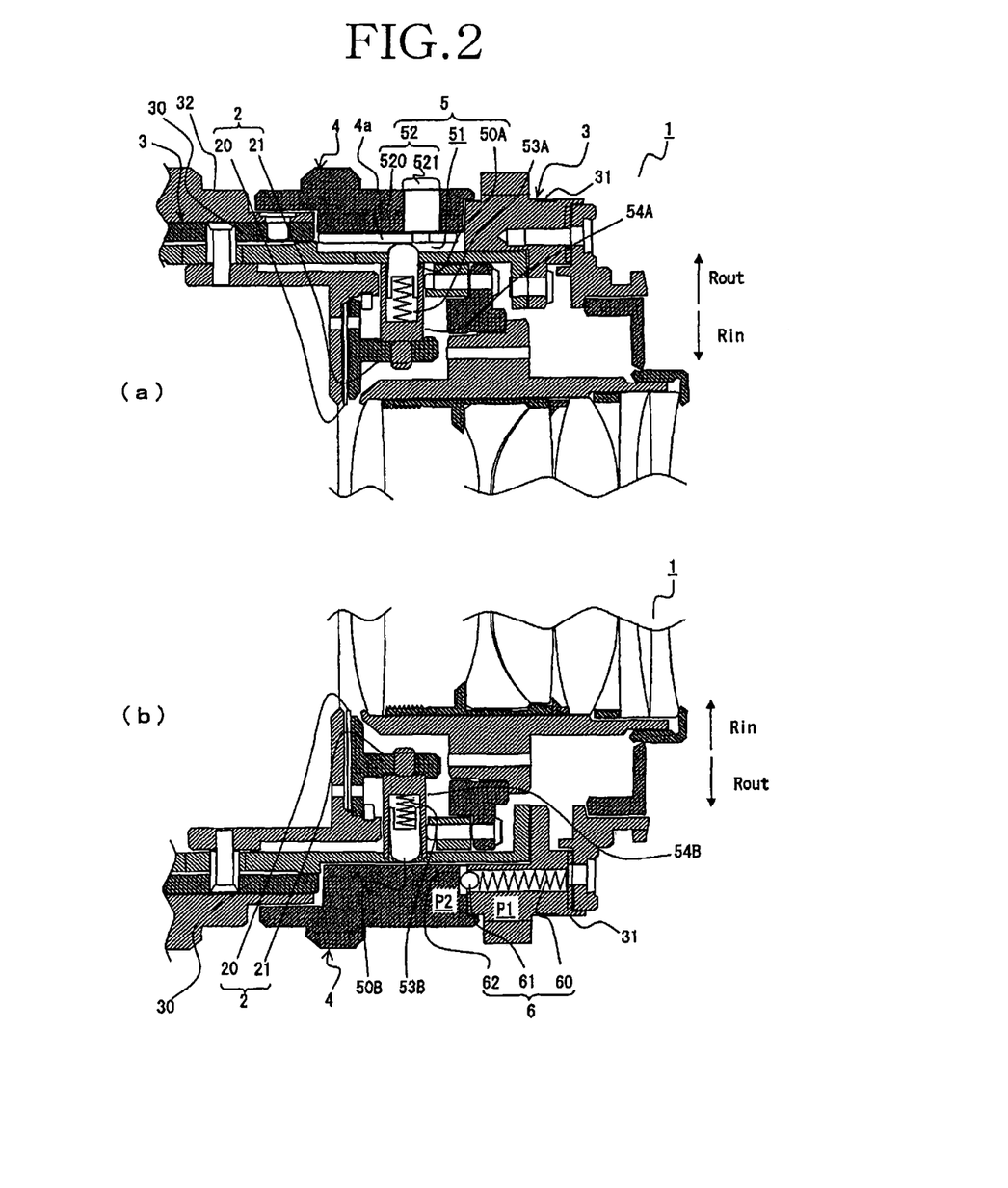
Figure 3:
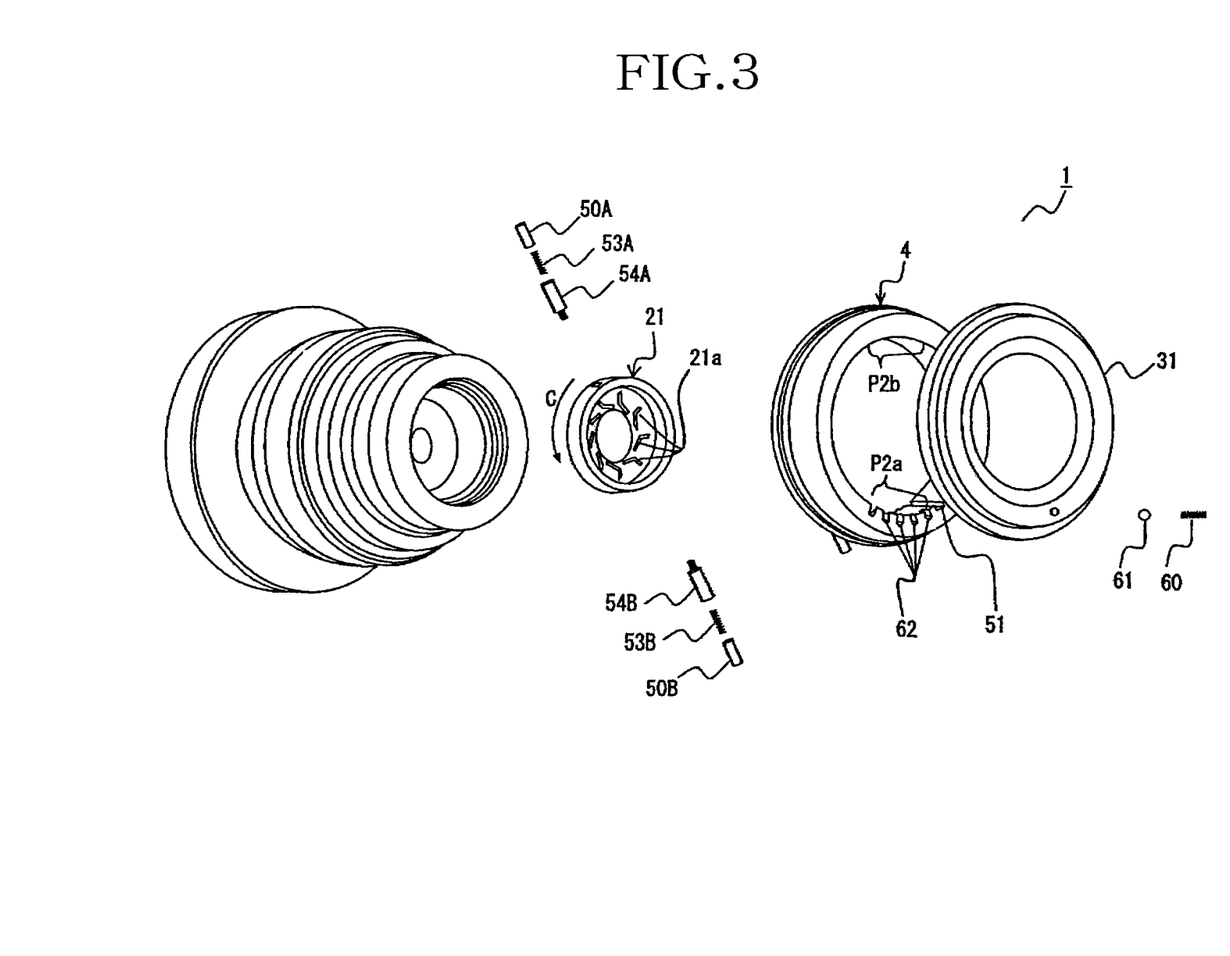
FIG. 3 is a partially disassembled perspective view that shows an instance of the configuration of the lens barrel according to the invention.
Figure 4:
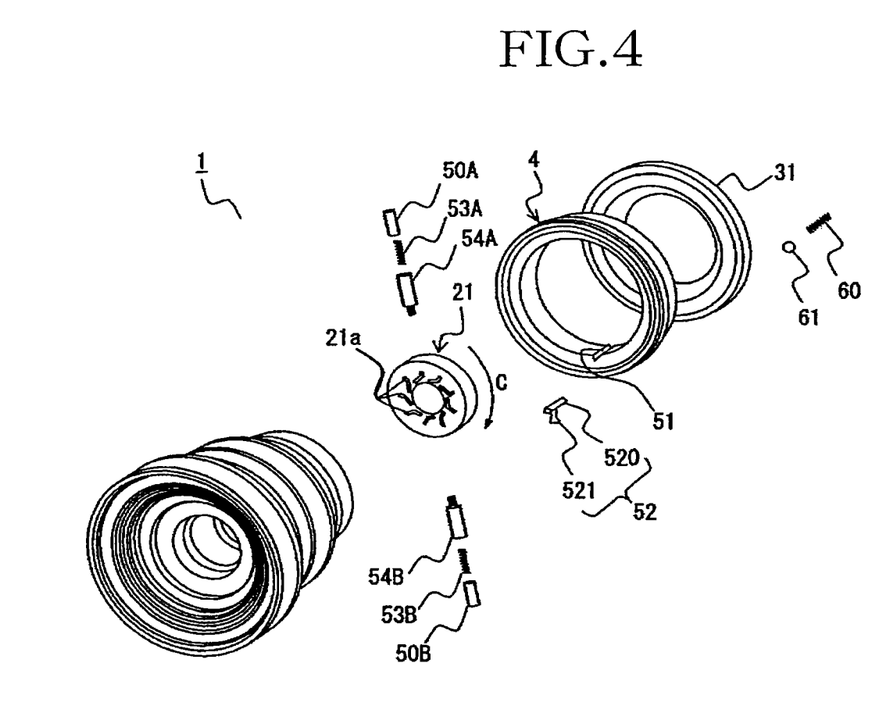
FIG. 4 is a partially disassembled perspective view that shows an instance of the configuration of the lens barrel according to the invention.

In the lens barrel embodiment (1) shown in FIGS. 1 and 2, the portion of the diaphragm ring 4 facing the fixed portion 3 is a second facing portion (P2) and the portion of the fixed portion 3 facing the second facing portion (P2) is a first facing portion (P1). In the lens barrel embodiment (301) shown in FIG. 9, the portion of the diaphragm ring (304) facing a cylindrical portion (333) is a first facing portion (P1) and the portion of the cylindrical portion (333) facing the first facing portion (P1) is a second facing portion (P2). The lens barrel 1, 301 according to the invention has a click mechanism 6, 306 that is formed or located at the first facing portion P1 and the second facing portion P2 providing a clicking tactile feel when the diaphragm ring 4, 304 is rotated. The first and second facing portions P1, P2 as exemplarily shown in FIG. 2(b) are end surfaces of the diaphragm ring 4 and the fixed portion 3 (that is, the end surfaces in the optical axis direction x and the portion adjacent to the end surface), but are not limited to such ones, and it is sufficient that the facing portions P1, P2 face each other. As exemplarily shown in FIG. 9, the portions P1 and P2 may be peripheral surfaces of the diaphragm ring 304 and the cylindrical portion 333 (that is, the outer peripheral surface and the portion adjacent thereto and the inner peripheral surface and the portion adjacent thereto) or another portions. For instance, the locking member 61 mentioned hereinafter may be located at the position where the first projection 50A or the second projection 50B is located in FIG. 1 and FIG. 2(b), the spring member for clicking 60 mentioned hereinafter may be located at the position where the first spring member 53A or the second spring member 53B is located, and the locking recess mentioned hereinafter may be located at the inner peripheral surface of the diaphragm ring 4 (that is, the position where the fitting member 51 is formed).

As detailedly shown in FIG. 2(b) and FIG. 9, the click mechanism 6, 306 has spring member 60, 360 for clicking attached to the first facing portion P1, a locking member 61, 361 that is urged against the second facing portion P2 through the operation of the spring member 60, 360 for clicking and a locking recess 62, 362 that is formed or located on the side of the second facing portion P2 so as to engage the locking member 61, 361. As exemplarily shown in FIG. 3, the second facing portion P2 has a locked surface portion P2a having two or more locking recesses 62 in a peripheral direction C, and a substantially flat surface portion P2b that has no locking recesses 62. As the result, the click mechanism is configured such that the locking member 61, 361 slides on the locked surface portion P2a when the diaphragm ring 4, 304 is oriented so that the first projection 50A, 350A is received into the fitting slot 51, 351 and the locking member 61, 361 slides on the substantially flat surface portion P2b when the diaphragm ring 4, 304 is oriented so that the second projection 50B, 350B is received into the fitting slot 51, 351. In an instance as shown in FIG. 2(b), the spring member 60 for clicking is located on the side of the fixed portion 3 with the portion of the fixed portion 3 (the cylindrical member 31) facing to the diaphragm ring 4 as the first facing portion P1, and the locking recess 62 is formed at the portion of the diaphragm ring 4 with the portion of the diaphragm ring 4 as the second facing portion P2. Alternatively, the spring member 60 for clicking may be located at the portion of the diaphragm ring 4, and the locking recess 62 may be formed at the portion of the fixed portion 3. In an instance as shown in FIG. 9, the spring member 360 for clicking is located on the side of the diaphragm ring 304 with the portion of the diaphragm ring 304 as the first facing portion P1, and the locking recess 362 is formed at the portion of a cylindrical portion 333 with a portion of the cylindrical portion 333 facing to the diaphragm ring 304 as the second facing portion P2. Alternatively, the spring member 360 for clicking may be located at the portion of the cylindrical portion 333, and the locking recess 362 may be formed at the portion of the diaphragm ring 304.

As exemplarily shown in FIG. 6(a), preferably, an indicator Q is indicated at a position adjacent to the diaphragm ring 4, 304 on the fixed portion 3, 303 (an annular member 32, 332), and two or more F-values 4A are indicated in a range of a circumferential direction of the diaphragm ring 4, 304, facing to the indication Q when the diaphragm ring 4, 304 is rotated, receiving the first projection 50A, 350A into the fitting slot 51, 351, and two or more T-values (that is, effectiveness diaphragm values in consideration of the transmittance of the lens) are indicated in the range of the circumferential direction of the diaphragm ring 4, 304, facing to the indication Q when the diaphragm ring 4, 304 is rotated, receiving the second projection 50B, 350B into the fitting slot 51, 351. Preferably, the diaphragm 2, 302 (and the positions of the fitting slot 51, 351 or the first and second projections 50A, 50B (or the first and second projections 350A, 350B)) is configured to have an opening in a size to realize the F-values 4A or the T-values 4B facing to the indication Q. The F-value is one that divides the focus distance of the lens by effective aperture diameter, and corresponds to brightness supposed that transmittance of the lens is 100%. And, the T-value is an index that shows substantial brightness adding the transmittance of an optical system (that is, the actual brightness to reach a sensor), and a relation between the T-value and F-value is expressed by the following expression.

$$T \text{ value} = (F \text{ value}/(\text{transmittance } (\%))^{1/2} \times 10$$

Conventionally, the diaphragm is adjusted with the F value when taking still images, and the diaphragm is adjusted with T-value when taking moving picture. According to the invention, both T-value and F-value are indicated on the diaphragm ring 4, 304, so that it is possible to properly adjust the diaphragm when both taking the still images and the moving pictures.

On the other hand, the camera according to the invention has the lens barrel 1, 301 having the above-mentioned configuration. Preferably, the lens barrel 1, 301 is an exchangeable one, but the lens barrel that is impossible to be exchanged (that is, the lens barrel as a parts comprising the camera) is not excluded.

EXPLANATION OF REFERENCE NUMBERS

1 . . . lens barrel
2 . . . diaphragm
3 . . . fixed portion
4 . . . diaphragm ring
4A . . . F-value
4B . . . T-value
6 . . . click mechanism
50A . . . first projection
50B . . . second projection
51 . . . fitting slot
52 . . . link releaser
53A . . . first spring member
53B . . . second spring member
60 . . . spring member for clicking
61 . . . locking member
62 . . . locking recess
301 . . . lens barrel
302 . . . diaphragm
303 . . . fixed portion
304 . . . diaphragm ring
306 . . . click mechanism
350A . . . first projection
350B . . . second projection
351 . . . fitting slot
352 . . . link releaser
353A . . . first spring member
353B . . . second spring member
360 . . . spring member for clicking
361 . . . locking member
362 . . . locking recess
520 . . . actuator
521 . . . push button
3520 . . . actuator
3521 . . . push button
C . . . peripheral direction
P1 . . . first facing portion
P2 . . . second facing portion
P2a . . . locked surface portion
P2b . . . substantially flat surface portion
Q . . . indication
Rin . . . inward direction
Rout . . . outward direction

The invention claimed is:

1. A lens barrel comprising:
a diaphragm whose aperture diameter can be changed;
a fixed portion that stores the diaphragm;
a diaphragm ring that is rotatably attached to the fixed portion so as to adjust the aperture diameter of the diaphragm, wherein a portion of the fixed portion facing the diaphragm ring is a first facing portion, and a portion of the diaphragm ring facing the fixed portion is a second facing portion;
first and second projections that are located at two positions along a peripheral direction of the diaphragm for releasably linking the diaphragm ring to the diaphragm for adjusting the aperture diameter of the diaphragm;
a fitting slot that is formed on a side of the diaphragm ring for alternatingly receiving one of the first and second projections thereinto at a given time according to the rotation position of the diaphragm ring, wherein when the first or second projection is received thereinto the diaphragm ring is linked to the diaphragm for adjusting the aperture diameter of the diaphragm;
a link releaser comprising a button that is configured to release the first and second projections from the fitting slot when the button is actuated and allow the diaphragm ring to rotate, being separated from the diaphragm; and
a click mechanism that is formed or located at the first facing portion and the second facing portion providing a clicking tactile feeling when the diaphragm ring is rotated;
wherein the click mechanism has a spring member for clicking attached to the first facing portion, a locking member that is urged against the second facing portion through the spring member for clicking, and two or more locking recesses that are formed or located on a side of the second facing portion receiving the locking member;
wherein the second facing portion has a locked surface portion having the two or more locking recesses in a peripheral direction, and a substantially flat surface portion that has no locking recesses;
whereby when the diaphragm ring is oriented so that the first projection is received into the fitting slot, the locking member slides on the locked surface portion, thus providing a clicking mode when the diaphragm ring is rotated for adjusting the aperture diameter of the diaphragm; and
whereby when the diaphragm is oriented so that the second projection is received into the fitting slot the locking member slides on the substantially flat surface portion, thus providing a non-clicking mode when the diaphragm ring is rotated for adjusting the aperture diameter of the diaphragm.

2. The lens barrel according to claim 1, wherein the lens barrel has a longitudinal axis and a direction that is pointing radially outward from the longitudinal axis of the lens barrel is outward direction and a direction that is pointing radially inward towards the longitudinal axis of the lens barrel is inward direction, the lens barrel further comprising:
first and second spring members attached on a side of the diaphragm for urging the first and second projections in the outward direction, and the fitting slot being formed on an inner peripheral face of the diaphragm ring;
wherein the link releaser having an actuator provided within the fitting slot and engaged with the button and the actuator is located at a position where the first and second projections received in the fitting slot are urged against the actuator, and the button protrudes from an outer peripheral face of the diaphragm ring in the outward direction;

whereby the first or the second projection received in the fitting slot can be released by pushing the button in the inward direction engaging the actuator to push the first or the second projection in the inward direction and out of the fitting slot.

3. The lens barrel according to claim 2, wherein the button is located to be inserted in a through hole that is formed at the diaphragm ring.

4. The lens barrel according to claim 1, wherein an indicator is indicated at a position adjacent to the diaphragm ring on the fixed portion, two or more F-values are indicated in a range of a circumferential direction of the diaphragm ring, facing to the indication when the diaphragm ring is rotated to a position where the first projection is received into the fitting slot, and two or more T-values are indicated in the range of the circumferential direction of the diaphragm ring, facing to the indication when the diaphragm ring is rotated to a position where the second projection is received into the fitting slot, and the diaphragm is configured to have an opening in a size to realize the F-values or the T-values facing to the indication.

5. A camera having the lens barrel of claim 1.

* * * * *